(12) United States Patent
Schauer et al.

(10) Patent No.: US 7,026,051 B2
(45) Date of Patent: Apr. 11, 2006

(54) METHOD OF TREATING THE SURFACE OF SUBSTRATES

(75) Inventors: Thadeus Schauer, Neuhengstett (DE); Mark Entenmann, Fellbach (DE); Claus D. Eisenbach, Sindelfingen (DE); Waldemar Ph. Oechsner, Ludwigsburg (DE)

(73) Assignee: Forschungsinstitut fur Pigmente und Lacke e.V., Stuttgart (DE)

( * ) Notice: Subject to any disclaimer, the term of this patent is extended or adjusted under 35 U.S.C. 154(b) by 271 days.

(21) Appl. No.: 10/775,891

(22) Filed: Feb. 9, 2004

(65) Prior Publication Data

US 2004/0253444 A1 Dec. 16, 2004

Related U.S. Application Data

(63) Continuation of application No. PCT/EP02/08849, filed on Aug. 7, 2002.

(30) Foreign Application Priority Data

Aug. 9, 2001 (DE) .......................... 101 40 246

(51) Int. Cl.
B32B 5/16 (2006.01)

(52) U.S. Cl. ................ 428/403; 428/407; 427/212; 427/213.31; 427/213.33; 427/215; 427/222

(58) Field of Classification Search ................ 428/403, 428/407; 427/212, 213.31, 213.33, 215, 222
See application file for complete search history.

(56) References Cited

U.S. PATENT DOCUMENTS

| 3,393,162 A | 7/1968 | Cox et al. |
| 3,884,871 A | 5/1975 | Herman et al. |
| 4,127,422 A | 11/1978 | Guzi, Jr. et al. |
| 4,173,606 A | 11/1979 | Stoy et al. |

(Continued)

FOREIGN PATENT DOCUMENTS

| DE | 28 14 030 | 9/1978 |
| DE | 199 00 494 | 7/2000 |
| EP | 0 365 111 A2 | 4/1990 |
| EP | 0 502 576 | 9/1992 |
| EP | 0 629 649 | 12/1994 |
| EP | 0 718 327 | 6/1996 |
| EP | 0 858 795 | 8/1998 |
| FR | 2 738 252 | 3/1997 |
| FR | 2 755 972 | 5/1998 |
| GB | 686269 | 1/1953 |
| GB | 1049772 | 11/1966 |
| GB | 1077422 | 7/1967 |

(Continued)

OTHER PUBLICATIONS

Boundy et al.; Stryene—Its Polymers, Copolymers and Derivatives; 1952; pp. xi–xxii and 1; Reinhold Publishing Corporation; New York, New York.

(Continued)

Primary Examiner—Ieszek B Kiliman
(74) Attorney, Agent, or Firm—Leydig, Voit & Mayer, Ltd.

(57) ABSTRACT

In order to provide a method by means of which the surface of substrates can be protected from corrosive attack and which, in particular, avoids the necessity for oxidative treatment to form oxide layers on surfaces or for phosphatizing or chromatizing treatment steps and is, in addition, simple to apply, it is proposed that the substrate be brought into contact with a solution of a polymer which exhibits UCST properties and which is caused to be deposited onto the surface of the substrate as a layer by decreasing the temperature of the polymer solution.

26 Claims, 1 Drawing Sheet (1 of 1 Drawing Sheet(s) Filed in Color)

U.S. PATENT DOCUMENTS

| | | | |
|---|---|---|---|
| 4,250,227 A | | 2/1981 | Claude et al. |
| 4,851,144 A | * | 7/1989 | McGraw et al. ............... 252/68 |
| 4,900,791 A | | 2/1990 | Siol et al. |
| 4,946,940 A | * | 8/1990 | Guckes et al. ............... 528/483 |
| 4,959,169 A | * | 9/1990 | McGraw et al. ............... 252/68 |
| 4,965,783 A | * | 10/1990 | Siol et al. .................... 369/100 |
| 5,021,180 A | * | 6/1991 | McGraw ....................... 252/68 |
| 5,451,459 A | | 9/1995 | Ogawa et al. |
| 5,460,817 A | | 10/1995 | Langley et al. |
| 5,492,646 A | | 2/1996 | Langley et al. |
| 5,652,316 A | | 7/1997 | May et al. |
| 5,972,433 A | | 10/1999 | Chen et al. |
| 6,133,047 A | | 10/2000 | Elaissari et al. |
| 6,159,457 A | * | 12/2000 | Mougin ................... 424/78.03 |
| 6,270,903 B1 | | 8/2001 | Feng et al. |
| 6,290,988 B1 | | 9/2001 | Van Vilsteren et al. |
| 6,686,046 B1 | * | 2/2004 | Schauer et al. ............. 428/403 |
| 2002/0048679 A1 | | 4/2002 | Lohmer et al. |

FOREIGN PATENT DOCUMENTS

| | | |
|---|---|---|
| JP | 60-58237 | 4/1985 |
| WO | WO 87/06152 | 10/1987 |
| WO | WO 92/20441 | 11/1992 |
| WO | WO 97/13789 | 4/1997 |
| WO | WO 97/45202 | 12/1997 |
| WO | WO 00/25938 | 5/2000 |

OTHER PUBLICATIONS

Choi et al.; Liquid–liquid equilibria of polydisperse polymer systems showing both UCST and LCST phase behaviors; Macromol. Chem. Phys.; 1999; pp. 1889–1896; vol. 200, No. 8.

Elias, Polymers, From Monomer and Macromolecules to Raw Materials; 1996; Section 5.1.5; pp. 183–184, Hüthig & Wepf, Hüthig GmbH.

Finch; Hydrolysis of Polyvinyl Acetate to Polyvinyl Alcohol; Polyvinyl Alcohol—Properties and Application; 1973; pp. 91–121; John Wiley & Sons; London, England.

Fujiki et al.; Radical Grafting from Carbon Black. Graft Polymerization of Vinyl Monomers Initiated by Azo Groups Introduced onto Carbon Black Surface; Polymer Journal, 1990; pp. 661–670; vol. 22, No. 8.

Ihara et al.; Surface Modification of Pigments with Temperature–Responsive Polymer Grafted by Plasma–Induced Polymerization; Journal of Photopolymer Science and Technology; 1998; pp. 315–320; vol. 11, No. 2.

Johnson, et al.; Dispersibility of Carbon Black by Polyvinyl Alcohol Solutions; Br. Polym. J.; Nov. 1969; pp. 266–272; vol. 1.

O'Brien et al.; Electroacoustic Determination of Particle Size and Zeta Potential; Journal of Colloid and Interface Science; 1995; pp. 406–418; vol. 173.

Park et al.; Permeation Control through Porous Membranes Immobilized with Thermosensitive Polymer; Langmuir; 1998; pp. 910–914; vol. 14.

Sato et al.; UCST and LCST behaviour in polymer blends containing poly(methyl methacrylate–stat–styrene); POLYMER; 1998; pp. 773–780; No. 4; vol. 39.

Suwa et al.; Effects of salt on the temperature and pressure responsive properties of poly(N–vinylisobutyramide) aqueous solutions; Colloid Polymer Science; 1998; pp 529–533, vol. 276, No. 6.

Tsubokawa et al.; Grafting of Polymers onto Carbon Black Surface by Trapping of Polymer Radicals Formed by Redox Reaction: J. Jpn Soc. Colour Mater; 1999; pp 475–481; vol. 72, No. 8, Japan.

Tsuda; A New and Convenient Synthesis of Poly (Vinyl Ester)s; Polymer Letters; 1963; pp. 215; vol. 1.

* cited by examiner

Luminosity following exposure of specimens to condensed water test for 10 h

METHOD OF TREATING THE SURFACE OF SUBSTRATES

This application is a continuation of PCT/EP02/08849 filed Aug. 7, 2002, which is incorporated in its entirety.

FIELD OF INVENTION

The invention relates to a method of treating substrates, in particular a method of hydrophobizing or hydrophilizing the surface thereof.

BACKGROUND OF THE INVENTION

Various surfaces, particularly metallic surfaces, tend to corrode in a moist environment and thus require protection therefrom.

Commonly used methods of passivating surfaces against corrosive attacks are oxidative treatments for forming oxide layers on surfaces, and phosphatizing or chromatizing treatments, in which case so-called conversion coatings are produced, which in the latter case consist of toxic chromates.

In the case of particles such as occur, for example, in metallic pigments in the form of aluminum flakes, it is difficult to produce an adequately dense coating using conventional processes, particularly because the coefficient of thermal expansion of the metal, in this case aluminum, differs from the coefficients of expansion of aluminum oxide so that the protective coating tends to form cracks when subjected to thermal stress.

OBJECTS AND SUMMARY OF THE INVENTION

When insufficiently protected surfaces are coated with paint or lacquer, blisters and corrosion products later form in a moist environment, ie the layer of lacquer or paint becomes detached from the corroding undersurface.

It is an object of the present invention to provide a method by means of which surfaces can be protected from corrosive attack and which avoids, in particular, the use of prior art processes and, in addition, is simple to use.

Furthermore, it is desired to create an organic layer which can have a coupling and compatibilizing effect on other organic layers.

Another object of the invention comprises the adjustment of the hydrophobicity or hydrophilicity of the surface to be coated.

The method of the invention achieves the object mentioned above by causing the substrate to be brought into contact with a solution of a polymer, which polymer exhibits UCST properties and is caused to be deposited onto the surface of the substrate as a layer by decreasing the temperature of the polymer solution.

Coating of the substrate may be partial, particularly with the formation of polymer islands; but the coat may alternatively be in the form of an all-over, uninterrupted layer.

The method of the invention shows greater advantages in achieving stabilization of particles against flocculation, particularly in non-polar media.

Polymers having UCST properties (referred to below as UCST polymers), precipitate from a polymer solution when the temperature of the latter falls below its critical temperature (UCST=upper critical solution temperature). This temperature depends on the particular solvent used for the polymer.

A description of UCST polymers and their properties is given in the monograph "Polymere" by Hans-Georg Elias, Huethig and Wepf-Verlag, Zug, 1996, pages 183–184.

The behavior of UCST polymers during temperature reduction of a polymer solution differs from the usual effect of precipitation of substances present in a saturated solution since reducing the temperature does not effect a gradual reduction in the solubility of the dissolved substance but causes, within a relatively narrow temperature range, drastic lowering of the solubility of the dissolved substance, ie the UCST polymer.

This property is utilized in the present invention to achieve deposition or separation of the UCST polymer onto a surface.

Preferred UCST polymers used in the present invention are selected from the group comprising polystyrenes, polyvinyl alcohols, polyvinyl pyrazoles, polyethylene oxides, polyacrylic acids, and derivatives thereof.

The solvent used is usually an organic solvent.

Preferably, the temperature of the solution of the UCST polymer in the solvent when it is brought into contact with the substrate surface is greater than the UCST, after which the temperature of the solution is reduced to a value in the UCST range or lower.

Since the UCST or the associated phenomena of deposition or change of solubility of the dissolved polymers show a certain bandwidth, it is possible to effect separation of the UCST polymer at temperatures ranging from ca UCST+5° C. to UCST −30° C. While working in this temperature range it is possible to influence the layer thickness that can be obtained and, in particular, the density of the coating on the substrate surface, in a simple and favorable manner.

More preferably the temperature range in which the deposition of the UCST polymer onto the surface of the substrate is carried out is from T=UCST to T=UCST −10° C.

In this temperature range particularly dense layers of the UCST polymer are obtained on the surface of the substrate. Preferably, the temperature is maintained at the selected low level at which the UCST polymer separates until substantially complete separation of the UCST polymer from the solution onto the surface of the substrate has occurred.

Following separation of the UCST polymer onto the surface of the substrate, the surface of the substrate thus coated can be washed with a solvent for the UCST polymer at a temperature in the USCT range minus 10° C. or lower. With the temperature adjusted to this level the solvents can remove only those polymer molecules that are loosely deposited on the surface so that only the layer directly attached to the surface of the substrate remains. This avoids any undesirable detachment of UCST polymers during subsequent treatment of the coated surface of the substrate, which might disturb the aftertreatment.

Using the method of the invention, it is possible to effect selective control of the hydrophobicity and hydrophilicity of the surface of substrates, and the degree of such control can be set within certain limits, for example, alone by selecting an appropriate UCST polymer.

The same effect as that attained by the washing step can be achieved by keeping the substrate together with the solution or solvent, following separation of the UCST polymer, for a short period, for example, ca 5 minutes, at a temperature above the UCST or above the temperature used for the deposition step, after which the substrate and solution are parted from each other. This has the same effect as the washing operation in that only those polymer molecules which are loosely deposited on the surface of the substrate or on the actual dense layer of UCST polymer are absorbed by the solvent and removed.

The preferred increase in temperature used in this step ranges up to 5 degrees above the UCST or the temperature used for deposition.

In order to obtain particularly secure coatings which also allow special freedom in subsequent processes regarding, for example, the choice of solvent used, provision may be made for immobilization, by a chemical reaction, of the UCST polymer layer after it has been deposited onto the surface of the substrate. Various reactions are possible in which UCST polymers can be used.

Alternatively, the polymer can be provided with active groups which can cause immobilization of the polymer. Examples of such active groups are carboxyl, amino, hydroxyl, and mercapto groups.

A particularly preferred UCST polymer for the purposes of the present invention is polystyrene. Modifications of polystyrene in precipitated form, which can at the same time cause immobilization or crosslinking of the polystyrene, are known from the literature by R. H. Boundy, R. F. Beuer "Styrene—Its Polymers, Copolymers and Derivatives", Reinhold Publishers Corporation, New York 1952.

If immobilization of the coating of UCST polymer present on the surface of the substrate is carried out, the step of washing the surface of the substrate is preferably executed following immobilization.

The following process is particularly suitable for effecting immobilization:

Deposition of a UCST polymer modified with double bonds followed by free radical crosslinking (initiated by UV light or radical formers).

Furthermore, the UCST polymer can be modified prior to or after deposition, in order to influence the hydrophobicity or hydrophilicity of the coating present on the surface and thus to exert very selective control on the hydrophobic or hydrophilic properties of the surface. This offers a further possibility of modifying the hydrophobizing/hydrophilizing effect over and above the choice of UCST polymer used.

For modification of the UCST polymer used to alter the hydrophobic properties, use can be made of the following methods:

deposition of polar-modified or ionically modified UCST polymers (eg, with sulfo groups or with PEO-modified styrene) or nonpolar-modified UCST polymers (eg, polystyrene copolymers with butadiene);

effecting modification following deposition (in the case of polystyrene by Friedel and Crafts acylation/alkylation).

Preferably, the UCST polymer is modified and at the same time immobilized after deposition thereof onto a surface.

Since the coating produced by the invention on the surface of the substrate exhibits a certain degree of elasticity, the difference in the coefficient of thermal expansion thereof from that of the underlying surface of the substrate can be readily compensated. The formation of cracks in the coating, such as is observed, for example, on protective brittle oxide layers of aluminum oxide or silicon dioxide or on chromates, is avoided with certainty with the present method involving coating with UCST polymers.

The method of the invention is used for providing both particles and flat substrates with a surface coating.

When the substrate used is a particulate substrate, the UCST polymer used is preferably one having a molar mass of from 1,000 to 50,000 g/mol.

When the substrates used are flat substrates, the UCST polymer is one having a molar mass of from 1,000 to 500,000 g/mol.

Particulate substrates include a large variety of possibilities, for example, pigments, fillers, fibers, nano particles, particles of colloidal or micellar systems or alternatively the aforementioned lamellar particles used in metallic effect lacquers.

The method of the invention is particularly suitable for applying very thin layers, so-called nano layers, to a surface, which nano layers, despite their very slight layer thickness, can produce dense coverage of said surface.

The invention also relates to a surface bearing a coating of UCST polymer, which coating is produced by one of the methods of the invention discussed above.

Of particular significance are surfaces bearing a coating comprising a so-called nano layer and, in particular, those surfaces which are metallic surfaces.

Finally, the UCST polymers are selected such that their UCST is above the temperature at which the coated substrates will be later used. Preferably, the UCST of the polymers is 10° C., more preferably 15° C., above the operating temperature of the substrates. The measures described above achieve thermodynamic stabilization of the UCST polymers deposited onto the surface of the substrate.

Generally speaking, the layer thickness of the layer deposited on the surface can be influenced by a) carrying out the method of the invention a number of times in succession;
b) reducing the temperature to an appropriately low value below the UCST; and/or
c) using the dissolved UCST polymer in different concentrations.

The present invention assumes special significance for surface coating steel, galvanized steel, aluminum, or aluminum alloys.

The method of the invention can be repeated any number of times in order to increase the layer thickness of the deposited material on a surface. Particularly in the case of flat substrates, for which higher molar masses of the UCST polymers tend to be more favorable, a greater layer thickness is obtained per process step or deposition step.

This and further advantages of the invention are illustrated below in greater detail with reference to the examples and drawings.

BRIEF DESCRIPTION OF THE DRAWINGS

This application contains at least one color drawing.

DETAILED DESCRIPTION OF EMBODIMENTS

Figure 1:
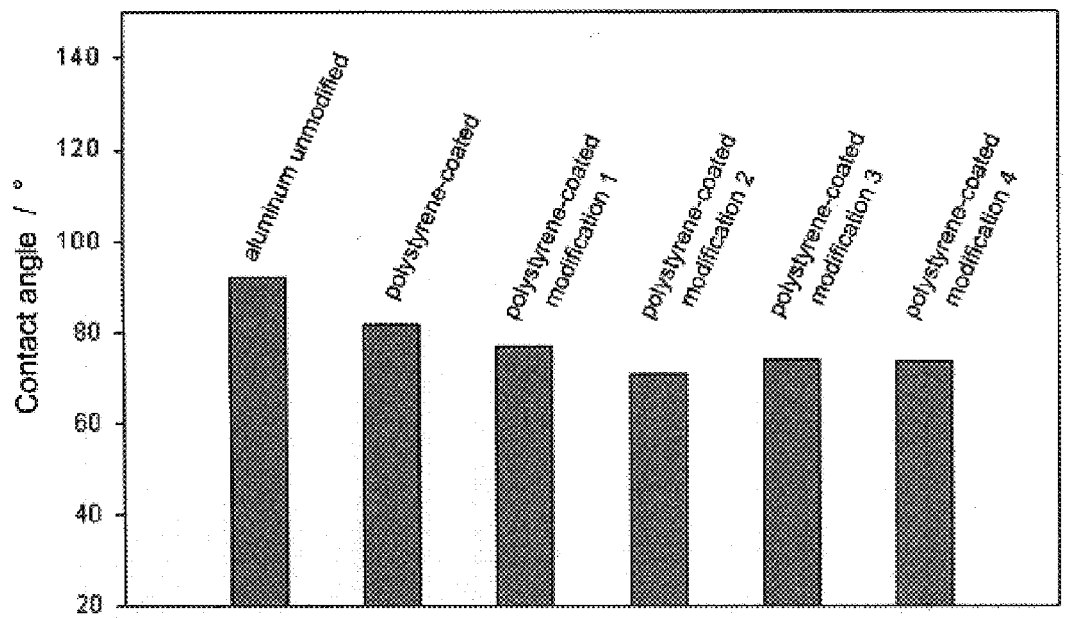
FIG. 1 shows the angle of contact between water and surfaces which have been coated with differently modified UCST polymers according to the invention.

The invention will now be described with reference to an example in which a particulate substrate, namely a metallic pigment, is used. The coating of metallic pigment particles obtained in the process of the invention causes hydrophobization of the surface and thus lowers the water absorption of paints containing such pigment particles. This leads to a reduction in the formation of blisters in the layer of paint and to improved corrosion resistance and resistance of the coated metallic pigments to environmental factors (acid rain). Preference is given in this context to layer thicknesses ranging from 5 to 100 nm.

EXAMPLE 1

12 g of pigment (Big Resist E900, sold by Eckart) are dispersed at 800 rpm for a period of 30 min in 40 mL of a 3:1 v/v decane/cyclohexane mixture with thermostatic temperature control at 23° C. The dispersion is then placed in a round-bottomed flask equipped with a reflux condenser and is heated to 65° C. 5 mL of a 33 wt % strength solution (room temperature) of a polystyrene polymer modified with acrylic end groups (molar mass 12,000 g/mol, sold by Aldrich, UCST: ca 50–55° C.) in cyclohexane are added, and the resulting mixture is cooled to 35° C. and, following a period of 10 minutes, again heated to 65° C. 2.2 mL of a 33 wt % strength solution of the polystyrene derivative are added (room temperature) and the mixture is cooled to 35° C. It is then heated to 50° C., filtered, and dried at room temperature.

Production of the pigmented paint for execution of the condensed water test according to DIN 50,017:

EXAMPLE 2 AND COMPARATIVE EXAMPLE 1

In each case, 1.4 g of treated metallic pigment of Example 1 and untreated pigment (Big Resist E900, sold by Eckart) are dispersed in 25 mL of a non-convertible single component polyester/polyacryl paint blend at 800 rpm for 15 min at 23° C. and applied to glass plates using a doctor blade giving a thickness of the moist layer of 200 μm. The plates are aired over a period of 12 h at room temperature and the layers of paint are dried for 30 min at 80° C.

Confirmation of the decreased water absorption by execution of a condensed water test according to DIN 50,017:

After the layers have cooled to room temperature, the condensed water test specified in DIN 50,017 is carried out at 40° C. Following a period of exposure of 94 h, the layer of paint produced using the commercial pigment (Comparative Example 1) showed twice as many blisters as the layer of paint produced using the pigment post-treated with polystyrene by the above method (Example 2).

In another example a flat substrate in the form of a sheet of aluminum was coated with a layer of UCST polymer and the coating then modified to adjust the hydrophobicity of the surface layer:

EXAMPLE 3

An aluminum plate (Al 99.5; dimensions 50×20×1.5 mm) is placed in a 50 mL screw cap jar together with 50 mL of a 1:4 chlorobenzene/decane mixture. 0.5 mL of a 33% strength solution of a polystyrene polymer modified with acrylic end groups (molar mass 12,000 g/mol, sold by Aldrich; UCST from ca 50° to 55° C.) in cyclohexane are added and the mixture is heated until the polymer has dissolved (ca 50–55° C.). The mixture is cooled to 25° C., and after 10 min it is again heated to 50° C. After re-cooling to 25° C., the aluminum plate is taken out.

For additional modification of the deposited layers, test pieces obtained as in Example 3 are each dipped in one of various reaction mixtures over a period of 2 h at 23° C. and then rinsed a number of times with distilled water and dried in a forced air oven for a period of 10 min at 80° C.
Modification 1:
Immersion in a reaction mixture comprising 50 mL of a 1:4 chlorobenzene/decane mixture, 5 mL of a ca 2% strength solution of anhydrous AlCl$_3$ in chlorobenzene, and 1 mL of propionic chloride.
Modification 2:
Immersion in a reaction mixture comprising 50 mL of a 1:4 chlorobenzene/decane mixture, 5 mL of a ca 2% strength solution of anhydrous AlCl$_3$ in chlorobenzene, and 1 mL of crotonic chloride.
Modification 3:
Immersion in a reaction mixture comprising 50 mL of a 1:4 chlorobenzene/decane mixture, 5 mL of a ca 2% strength solution of anhydrous AlCl$_3$ in chlorobenzene, and 1 mL of fumaric chloride.
Modification 4:
Immersion in a reaction mixture comprising 50 mL of a 1:4 chlorobenzene/decane mixture, 5 mL of a ca 2% strength solution of anhydrous AlCl$_3$ in chlorobenzene, and 1 mL of acetyl chloride.

When the polystyrene is appropriately modified and a crosslinking reaction is carried out, the polymer can be irreversibly immobilized (for details on such modifying reactions see R. H. Boundy, Styrene—Its Polymers, Copolymers and Derivatives, Reinhold Publishers Corporation, New York, 1952). A polymer layer immobilized in this way can be readily freed from uncrosslinked polymer by rinsing with cyclohexane. The angles of contact between water and the resulting aluminum specimens of Example 3 are listed in Table 1 and graphically summarized in FIG. 1. As may be seen from FIG. 1, the angle of contact of water can be varied by the above method within a range of from ca 75° to 85°.

TABLE 1

| Specimen | Contact angle of water [°] |
|---|---|
| Unmodified aluminum | 92.2 |
| Coated polystyrene | 81.5 |
| Coated polystyrene, modification 1 | 76.8 |
| Coated polystyrene, modification 2 | 70.9 |
| Coated polystyrene, modification 3 | 73.6 |
| Coated polystyrene, modification 4 | 73.2 |

The increased resistance to corrosion of the aluminum specimen coated with a relatively hydrophobic polystyrene layer compared with an uncoated aluminum specimen, or of a polystyrene-coated aluminum specimen additionally hydrophilized by the method involving modification 1, was examined by subjection of the specimens to a condensed water test (DIN 50,017, duration 10 h) and quantification by photometric means, based, in each case, on the uncoated specimen. The results are illustrated graphically in FIG. 2.

Figure 2:
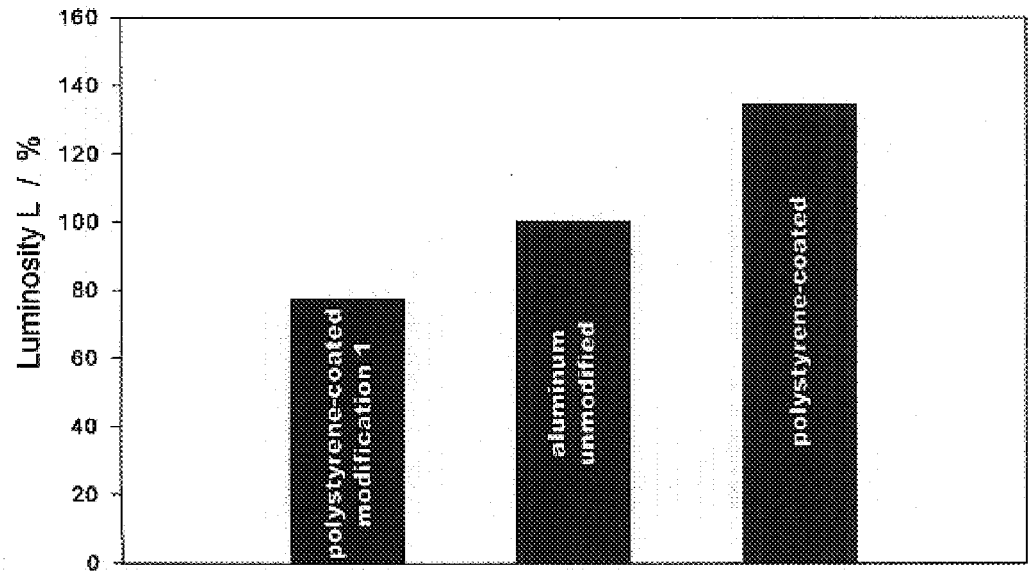
FIG. 2 shows the results of a corrosion resistance test on surfaces coated in the manner herein proposed.

A higher luminosity value indicates less propensity of the specimen to corrosion. Thus the results shown in FIG. 2 show very good conformity with the results of the measurements of the contact angles (FIG. 1). A greater contact angle measured for the aluminum post-treated with only polystyrene indicates greater hydrophobicity of the coating. Accordingly the corrosive effects are less pronounced than in the case of an additionally hydrophilically modified polystyrene (modification 1).

What is claimed is:

1. A method of treating a surface of substrates, comprising the steps of contacting the substrate with a solution of a polymer which exhibits UCST properties, and decreasing the temperature of the polymer solution to cause the polymer to be deposited on the surface of the substrate as a layer.

2. The method as claimed in claim 1, further comprising the step of selecting the polymer from the group comprising polystyrenes, polyvinyl alcohols, polyvinyl pyrazoles, polyethylene oxides, polyacrylic acids, and derivatives thereof.

3. The method as claimed in claim 1 wherein the solution contains an organic solvent.

4. The method as claimed in claim 1 wherein the temperature of the solution when contacted with the surface of the substrate is greater than the UCST of the polymer in the solvent, and the temperature of the solution is then decreased to a value within the UCST range or lower.

5. The method as claimed in claim 1 wherein the temperature to which the solution is cooled ranges from ca T=UCST+5° C. to T=UCST−30° C.

6. The method as claimed in claim 5, wherein said temperature range is from T=UCST to T=UCST−10° C.

7. The method as claimed in claim 1 wherein the temperature is kept at the low level until substantially complete deposition of the polymer onto the surface of the substrate has been achieved.

8. The method as claimed in claim 1 wherein following deposition of the polymer the method further comprising the step of washing, the coated surface of the substrate is washed with a solvent for the polymer at a temperature equal to approximately the UCST of the polymer in the solvent minus 10° C. or lower.

9. The method as claimed in claim 1 wherein following deposition of the polymer, the method further comprises the steps of keeping the substrate and the solution at a temperature above the UCST for a short period, and subsequently parting the substrate and solution from each other.

10. The method as claimed in claim 9, wherein the temperature reached in the keeping step is not higher than 5° C. above the UCST.

11. The method as claimed in claim 1 further comprising the step of, during or following deposition of the polymer onto the surface of the substrate, immobilizing the polymer by means of active groups or a chemical reaction.

12. The method as claimed in claim 11, further comprising the step of washing the surface of the substrate following the immobilizing step.

13. The method as claimed in claim 11 wherein said immobilizing step comprises the step of depositing a polymer modified with olefinic groups, which is then free-radically immobilized.

14. The method as claimed in claim 1 further comprising the step of modifying said polymer to selectively influence the wetting angle of the coated surface of the substrate prior to deposition of the polymer onto the surface of the substrate.

15. The method as claimed in claim 14, wherein said modifying step is effected by means of non-polar alkyl groups or with polar groups.

16. The method as claimed in claim 15, further comprising the step of modifying and crosslinking the polymer following deposition of the polymer onto the surface of the substrate.

17. The method as claimed in claim 1 wherein the substrate is a particulate substrate and that the polymer has a molar mass of from 1,000 to 50,000 g/mol.

18. The method as claimed in claim 1 wherein the substrate is a flat substrate and that the polymer has a molar mass of from 1,000 to 500,000 g/mol.

19. The method as claimed in claim 17, wherein the particulate substrate is selected from the group comprising pigments, fillers, fibers, nano particles, and particles of colloidal or micellar systems.

20. The method as claimed in claim 1 further comprising the step of coating the surface of the substrate with a nano layer of a polymer.

21. The method as claimed in claim 1, the polymer is selected such that its UCST is above the operating temperature of the substrate.

22. A substrate having a polymer-coated surface, produced by the method as claimed in claim 1.

23. The substrate as claimed in claim 22, wherein the coating is a nano layer.

24. The substrate as claimed in claim 22 wherein the substrate is a metallic substrate.

25. The substrate as claimed in claim 24 wherein the substrate is made of steel, galvanized steel, aluminum, or an aluminum alloy.

26. The substrate as claimed in claim 22 wherein the substrate is a particulate substrate, selected from the group comprising pigments, fillers, fibers, or lamellar particles, nano particles, and particles of colloidal or micellar systems.

* * * * *

UNITED STATES PATENT AND TRADEMARK OFFICE
CERTIFICATE OF CORRECTION

PATENT NO. : 7,026,051 B2  Page 1 of 1
APPLICATION NO. : 10/775891
DATED : April 11, 2006
INVENTOR(S) : Schauer et al.

It is certified that error appears in the above-identified patent and that said Letters Patent is hereby corrected as shown below:

Title Page
Inventors (75), the second inventor's name "Mark Entenmann" should read --Marc Entenmann--.

Title Page
Under Related U.S. Application Data (63), the application number "PCT/EP02/08849" should read --PCT/EP02/08847--.

Signed and Sealed this

Twenty-eighth Day of November, 2006

JON W. DUDAS
*Director of the United States Patent and Trademark Office*